United States Patent [19]

Ball et al.

[11] Patent Number: 4,786,305

[45] Date of Patent: Nov. 22, 1988

[54] HEAT TREATMENT OF FLAT PHOTOCHROMIC SHEET GLASS

[75] Inventors: Edith M. Ball, Addison; Patricia A. Drake, Big Flats; David J. Kerko, Corning, all of N.Y.

[73] Assignee: Corning Glass Works, Corning, N.Y.

[21] Appl. No.: 80,903

[22] Filed: Aug. 3, 1987

[51] Int. Cl.$^4$ .............................................. C03C 4/06
[52] U.S. Cl. ...................................... 65/30.11; 65/33; 501/13
[58] Field of Search ................ 65/30.11, 33, 117, 118; 501/13

[56] References Cited

U.S. PATENT DOCUMENTS

| | | | |
|---|---|---|---|
| 3,197,296 | 7/1965 | Eppler | 501/13 |
| 3,449,103 | 6/1969 | Stookey | 501/13 |
| 4,213,772 | 7/1980 | Lemker | 65/30.11 |
| 4,417,912 | 11/1983 | Abe | 65/33 |

FOREIGN PATENT DOCUMENTS 2047372  4/1971  Fed. Rep. of Germany ........ 501/13

Primary Examiner—Kenneth M. Schor
Attorney, Agent, or Firm—Clinton S. Janes, Jr.

[57] ABSTRACT

This invention is directed to a method for heat treating a sheet of a potentially photochromic glass to cause the growth of silver halide crystals therein which impart photochromic properties thereto, wherein the heat treated sheet will be essentially free from thermal deformation and surface defects, and the photochromic properties exhibited therein will be essentially uniform across the area of the sheet. The method involves first placing a sheet of potentially photochromic glass on top of a sheet of carrier glass that exhibits a softening point at least 50° C. higher than the temperature at which the potentially photochromic glass will be heat treated, and thereafter subjecting the stacked sheets to the heat treatment temperature desired for growing silver halide crystals in the glass.

8 Claims, No Drawings

HEAT TREATMENT OF FLAT PHOTOCHROMIC SHEET GLASS

BACKGROUND OF THE INVENTION

Photochromic, phototropic, or reversibly darkening glasses, as such have been variously termed, had their genesis in U.S. Pat. No. 3,208,860. That patent discloses glass articles containing silver halide crystals which impart the photochromic properties thereto. Whereas numerous base glass compositions to provide matrices for those crystals have been described and claimed in the patent literature, the alkali metal oxide ($R_2O$) aluminoborosilicate system has seen by far the greatest service in commercial applications.

The preferred base compositions of U.S. Pat. No. 3,208,860 consisted essentially, in weight percent on the oxide basis, of about 4–26% $Al_2O_3$, 4–26% $B_2O_3$, 40–76% $SiO_2$, and the remainder $R_2O$, wherein $R_2O$ consisted of at least one member in the indicated proportion selected from the group of 2–8% $Li_2O$, 4–15% $Na_2O$, 6–20% $K_2O$, 8–25% $Rb_2O$, and 10–30% $Cs_2O$, the sum of $R_2O + Al_2O_3 + B_2O_3 + SiO_2$ constituting at least 85% of the total composition. Photochromic behavior was developed through the inclusion of at least one halide in a minimum effective amount of 0.2% Cl, 0.1% Br, and 0.08% I, and the inclusion of silver in at least the minimum effective amount of silver in at least the effective halide, 0.05% where bromide is the effective halide, and 0.03% where iodide is the effective halide.

Subsequent disclosures have varied the ranges of both the base glass composition and the silver halides in order to endow the products resulting therefrom with certain desired products. The following patents are representative of such disclosures, the ranges being defined in weight percent.

|  | U.S. Pat. No. 4,018,965 | U.S. Pat. No. 4,130,437 | U.S. Pat. No. 4,190,451 |
| --- | --- | --- | --- |
| $SiO_2$ | 54–66 | 57.1–65.3 | 20–65 |
| $Al_2O_3$ | 7–15 | 9.6–13.9 | 5–25 |
| $B_2O_3$ | 10–25 | 12–22 | 14–23 |
| $Li_2O$ | 0.5–4 | 1–3.5 | 0–2.5 |
| $Na_2O$ | 3.5–15 | 3.7–12 | 0–9 |
| $K_2O$ | 0–10 | 0–5.8 | 0–17 |
| $Li_2O + Na_2O + K_2O$ | 6–16 | 6–15 | — |
| PbO | 0–3 | 0–1.25 | 0–0.5 |
| Ag | 0.1–1 | 0.12–0.24 | 0.15–0.3 |
| Cl | 0.1–1 | 0.2–1 | 0.1–0.25 |
| Br | 0–3 | 0.06–0.25 | 0.1–0.2 |
| CuO | 0.008–0.16 | 0.002–0.02 | 0.004–0.02 |
| F | 0–2.5 | 0–2.5 | 0–2 |
| $Cs_2O$ | — | — | 0–6 |
| $Li_2O + Na_2O + K_2O + Cs_2O$ | — | — | 8–20 |

|  | U.S. Pat. No. 4,168,339 | U.S. Pat. No. 4,358,342 | U.S. Pat. No. 4,407,966 |
| --- | --- | --- | --- |
| $SiO_2$ | 54–66 | 55–60 | 56–60 |
| $Al_2O_3$ | 7–16 | 9–10 | 6–9 |
| $B_2O_3$ | 10–30 | 19–20.5 | 18–21 |
| $Li_2O$ | 0–4 | 2–2.5 | >2.5–3.5 |
| $Na_2O$ | 3–15 | 2–3 | 0.5–2.5 |
| $K_2O$ | 0–10 | 6–7 | 5–7 |
| PbO | 0.4–1.5 | 0.1–0.25 | 0.1–0.15 |
| $ZrO_2$ | — | — | 3.75–5 |
| Ag | >0.03–1 | 0.1–0.15 | >0.15–0.25 |
| Cl | 0.5–1.2 | 0.3–0.5 | 0.2–0.35 |
| Br | 0.2–0.5 | 0.05–0.15 | 0.075–0.15 |
| CuO | 0.008–0.03 | 0.0065–0.01 | 0.004–0.02 |
| $CeO_2$ | — | — | 0–0.5 |
| F | 0.2–0.5 | — | — |

|  | U.S. Pat. No. 4,549,894 | U.S. Pat. No. 4,608,349 |
| --- | --- | --- |
| $SiO_2$ | 5–61 | 54–58 |
| $Al_2O_3$ | 5–11 | 7–8 |
| $B_2O_3$ | 18–21 | 18–22 |
| $Li_2O$ | 1.5–3 | 3.75–4.5 |
| $Na_2O$ | 2–5 | 0–1 |
| $K_2O$ | 4.5–8 | 5.5–7.5 |
| $ZrO_2$ | — | 2–4.5 |
| Ag | >0.1–<0.2 | 0.20–0.33 |
| Cl | 0.2–0.6 | 0.30–0.50 |
| Br | 0.05–0.2 | 0.04–0.12 |
| CuO | 0.003–0.015 | 0.007–0.012 |
| $CeO_2$ | 0.1–1.0 | — |
| $As_2O_3$ and/or $Sb_2O_3$ | 0.1–1.5 | 0–0.20 |

The generation of the silver halide crystals necessary to impart photochromic behavior can take place at a temperature within the transformation range of a glass. (The transformation range has been generally defined as that temperature at which a molten mass becomes an amorphous solid, that temperature commonly being deemed as residing in the vicinity of the annealing point of a glass.) Hence, the glass must exhibit sufficient viscosity to permit the development and growth of crystals. Nevertheless, it is well recognized that crystal growth occurs more rapidly as the temperature is raised, with the concomitant reduction in the viscosity of the glass, such that in commercial practice temperatures approaching and even somewhat exceeding the softening point of the glass are customarily employed in the heat treatment thereof to induce crystal growth. Accordingly, the heat treatment temperature utilized will be dependent upon the base composition of the particular glass. For example, in the alkali metal aluminoborosilicate-based photochromic glasses of the types disclosed in the patent literature, temperatures between about 600°–800° C., normally about 640°–700° C., are used.

It will be self-evident that temperatures in the vicinity of the softening point of the glass lead to thermal deformation of the glass articles. The most widespread commercial application of photochromic glass has been in the production of ophthalmic lenses. In pressing ophthalmic blanks, a curved former is employed and the glass sags to a desired curve. Thus, thermal deformation comprises part of the fabrication and crystallization process. In contrast, when heat treating sheet glass for such applications as sky lights and windows to develop silver halide crystals therein, thermal deformation has presented a very formidable problem.

Accordingly, the primary objective of the instant invention was to devise a means for heat treating potentially photochromic glass sheet to cause the in situ generation of silver halide crystals, wherein the sheet will be essentially free of thermal deformation and surface defects, and the photometric properties will be essentially uniform throughout the area of the sheet. As employed herein, "potentially photochromic glass" defines a glass containing silver and halide ions which, upon heat treatment, will crystallize in situ, thereby imparting photochromic behavior to the glass. In general, the thickness of the glass sheet will range about 0.5–3 mm, preferably about 1–2 mm.

SUMMARY OF THE INVENTION

Experience had indicated that heat treating potentially photochromic glass sheet on the belts of a conventional lehr resulted in numerous surface defects in, and warping of, the sheet. Because of that prior knowledge, an experiment was conducted wherein clear, potentially photochromic sheeting of 1.5 mm thickness of Corning Code 8124, a glass marketed by Corning Glass works, Corning, New York having a composition falling within U.S. Pat. No. 4,358,542 supra, was heat treated in a lehr while floating on a cushion of air. Inasmuch as the glass sheet touched nothing solid, the surface thereof was free of defects. Unfortunately, however, that technique resulted in the development of non-uniform photochromic properties across the area of the sheet due to uneven temperature spread. Furthermore, some warping of the sheet occurred which required flattening and re-annealing. Those steps, however, did not correct the non-uniform photochromic properties. Finally, the floating of sheet glass on a cushion of air is an inherently very costly process.

The lack of success with the process led to the possibility of heat treating the glass sheet while riding through a lehr on some form of carrier sheet having a smooth surface. It was appreciated that the carrier sheet would have to withstand temperatures higher than those used in heat treating potentially photochromic glasses, and would have to be available in large sheets of relatively thin cross section.

Because of its recognized high refractoriness, Corning Code 9617 rolled glass-ceramic sheeting, marketed by Corning Glass Works having a composition falling within U.S. Pat. No. 3,148,994, was used as a carrier for heat treating clear, potentially photochromic sheeting of Corning Code 8124 having a thickness of 1.5 mm. Rolled sheeting does not exhibit the exceptionally high degree of smoothness demonstrated by drawn sheeting. Such imperfections can be removed through grinding and polishing but, of course, at a cost.

. Unfortunately, however, the material demonstrated poor transfer of heat; behaving in the manner of a heat sink. Because of that behavior, much higher lehr temperatures were required to bring the glass sheeting to the temperature needed for developing the necessary silver halide crystals therein. As a matter of fact, the treatment of large glass sheets demands temperatures greater than the capability of the conventional glass heat treating/annealing lehr. Moreover, as can be appreciated, the top of the glass sheeting is exposed to a much higher temperature than the bottom surface. Finally, because of the thermal insulating character of the glass-ceramic, the bottom surface of the glass sheeting in contact with the glass-ceramic is exposed to continued substantial heating as the top surface of the glass sheeting begins to cool. Consequently, whereas the surface of the glass sheeting can be free from defects, the photochromic properties exhibited can be non-uniform across the area thereof.

Because of the poor heat transfer of the glass-ceramic sheeting, the possibility of utilizing metal sheeting as a carrier was investigated. Aluminum, galvanized steel, and stainless steel are readily available commercially in large sheets. Aluminum and galvanized steel sheetings deform at temperatures somewhat higher than 600° C. and, hence, are not suitable for the desire use. High temperature stainless steel, e.g., No. 309, can be used where care is observed to insure that the surface thereof is carefully cleaned and the temperature within the lehr does not exceed about 750° C. for any significant period of time. The cost of stainless steel is very high, however, and the weight thereof forbids simple transport of the sheets and loading them into a lehr. Furthermore, when a 0.0625" (≈1.5 mm) thick plate was used as a carrier for 1.5 mm thick Corning Code 8124 sheeting, the plate retained the high temperature to which it had been exposed in the lehr such as to require special handling equipment when unloading. Finally, surface defects were observed in the surface of the glass which contacted the metal plate. Each of those factors discourages the use of stainless steel sheeting as a carrier for glass sheeting. Sheeting prepared from highly refractory metals can be purchased, but they are extremely expensive and, again, the weight thereof inhibits its easy manipulation.

It was recognized that a bath of molten tin, such as is used in the float glass process, could not be employed, since the silver in the potentially photochromic glass would be reduced. That reduction is evidenced by the glass taking on a yellow tint. Moreover, the silver in the glass would cause contamination of the tin bath.

We have found that thin glass sheeting exhibiting a softening point significantly higher than the temperature at which the potentially photochromic glass will be heat treated, i.e., greater than 50° C. and, preferably, greater than 100° C. higher, can provide an excellent re-usable carrier. Most preferably, the softening point of the carrier glass will be at least 800° C. Whereas flat glass sheets can be prepared from such highly refractory glasses as fused silica and VYCOR ® brand materials (VYCOR is a trademark of Corning Glass works), cost and difficulty of fabrication generally limit the selection of glasses to those having compositions within the borosilicate and aluminosilicate systems. The common soda-lime-silica glasses utilized in the production of containers and windows are not sufficiently refractory to be suitable for carriers. For ease in handling and to maintain light weight, the thickness of the sheet will generally range about 1-5 mm, preferably about 1-2 mm.

Two particularly useful glasses comprise the barium aluminoborosilicate Corning Code 7059 with a softening point of about 844° C., and the alkali metal aluminosilicate Corning Code 0317 with a softening point of about 870° C. The approximate composition of each glass is tabulated below, expressed in terms of weight percent on the oxide basis as calculated from the batch.

|  | Code 7059 | Code 0317 |
|---|---|---|
| $SiO_2$ | 48.57 | 62.25 |
| $Al_2O_3$ | 10.53 | 17.0 |
| BaO | 24.85 | — |
| $B_2O_3$ | 14.9 | — |
| $Na_2O$ | — | 12.5 |
| $K_2O$ | — | 3.4 |
| MgO | — | 3.39 |
| $TiO_2$ | — | 0.66 |
| CaO | — | 0.36 |
| $As_2O_3$ | 0.95 | 0.44 |
| $Sb_2O_3$ | 0.20 | — |

Both of those glasses can be continuously produced in large sheets employing standard glass drawing techniques, which sheets can be used in the present inventive process as drawn; that is, the surface quality of the sheets is excellent; no polishing thereof is necessary before use. In contrast, such highly refractory glasses as fused silica and VYCOR® brand glasses cannot be fabricated into sheets by means of conventional glass-drawing equipment. Both Corning Code 7059 and Corning Code 0317, when fabricated into wide sheets having a thickness of about 1.5 mm, are relatively lightweight, thereby permitting easy manipulation, and exhibit adequate thermal conductivity to insure the development of uniform photochromic properties across the breadth of the glass riding thereon. Hence, unlike the glass-ceramic sheet described above, the glass does not behave like a substantial heat sink and, therefore, there is no need to heat the lehr to a much higher temperature to bring the potentially photochromic glass sheeting to the temperature required for generating silver halide crystals in situ.

DESCRIPTION OF PREFERRED EMBODIMENTS

In the following laboratory example, Corning Code 7059 sheet glass having a cross section of about 1.5 mm comprised the carrier, and Corning Code 8124 sheet glass constituted the clear, potentially photochromic glass. The softening point of Corning Code 8124 is about 650° C. The work involved plates of Corning Code 8124 measuring 12"×12" (≈305 mm×305 mm) and 12"×24" (≈305 mm×610 mm) with a thickness of about 1.5 mm.

For ease in handling and study, plates of Corning Code 7059 were cut to dimensions slightly larger than the plates of Corning Code 8124 to be carried thereon. That practice avoids sagging defects which occur when the Corning Code 8124 hangs over the edge of the carrier plate. A parting agent, e.g., BN, may be sprayed onto the top surface of the carrier plate and the plate of Corning Code 8124 placed thereover for ease in release, although such is not necessary. The stacked glasses were placed into an electrically-heated lehr and heat treated at temperatures ranging between about 640°–800° C. for about 8–10 minutes. After that exposure the stacked glasses continued through the lehr to be annealed. Upon exiting from the lehr, the now photochromic glass plates were removed and the carrier plate was ready for re-use.

Table I below records the photochromic properties, in terms of percent transmittance, exhibited by a plate that had been treated at 700° C. The properties were measured utilizing the solar simulator apparatus disclosed in U.S. Pat. No. 4,125,775. A brief description of that apparatus is provided in U.S. Pat. No. 4,358,542. In the table the term $T_{D15}$ represents the percent transmittance exhibited by the glass plate after 15 minutes' exposure to the light source of the solar simulator; the term $T_{F5}$ represents the percent transmittance exhibited by the glass plate after 5 minutes' removal from the light source of the solar simulator. The transmittance of the glass plate in the undarkened state is about 91.5–92%.

TABLE I

| Measuring Temperature | $T_{D15}$ | $T_{F5}$ |
| --- | --- | --- |
| 40° C. | 44 | 84 |
| 25° C. | 29 | 65 |
| 12.5° C. | 25 | 42 |
| 0° C. | 24 | 32 |

Visual inspection indicated that the smooth surface of the carrier glass produced a photochromic glass plate exhibiting excellent flatness and surface quality. Moreover, the photochromism developed therein appeared to be uniform across the entire area of the plate.

It will be appreciated that, by varying the heat treatment parameters, the photochromic behavior of the glass can be modified. Such modifications are illustrated below in Table II. The legends in Table II have the same meaning as in Table I.

TABLE II

| Heat Treating Temperature | Measuring Temperature | $T_{D15}$ | $T_{F5}$ |
| --- | --- | --- | --- |
| 640° C. | 40° C. | 59.5 | 87.8 |
| 640° C. | 25° C. | 42.2 | 78.1 |
| 640° C. | 12.5° C. | 33.4 | 56.2 |
| 640° C. | 0° C. | 31.5 | 42.8 |
| 655° C. | 40° C. | 56.2 | 86.4 |
| 655° C. | 25° C. | 40.7 | 75.2 |
| 655° C. | 12.5° C. | 33.8 | 51.9 |
| 655° C. | 0° C. | 32.7 | 42.2 |
| 670° C. | 40° C. | 52.6 | 85.2 |
| 670° C. | 25° C. | 36.2 | 72.4 |
| 670° C. | 12.5° C. | 29.2 | 46.6 |
| 670° C. | 0° C. | 27.8 | 35.6 |
| 680° C. | 40° C. | 45.9 | 83.4 |
| 680° C. | 25° C. | 30.8 | 64.5 |
| 680° C. | 12.5° C. | 26.9 | 42.4 |
| 680° C. | 0° C. | 26.3 | 33.7 |
| 725° C. | 40° C. | 48.3 | 84.0 |
| 725° C. | 25° C. | 32.2 | 66.1 |
| 725° C. | 12.5° C. | 28.1 | 44.3 |
| 725° C. | 0° C. | 28.0 | 35.6 |

It is of interest to note that the glass did not darken to as low a transmittance when heat treated at 725° C. as when heat treated at 700° C. (Table I). It is believed that phenomenon is the result of the heat treatment temperature being so high that the silver halide crystals begin to re-dissolve in the glass such that fewer are available to produce the photochromic behavior.

We claim:

1. A method for heat treating a sheet of potentially photochromic glass to effect the in situ growth of silver halide crystals which impart photochromic properties to the glass, wherein the heat treated sheet of glass exhibiting photochromic properties will be essentially free from thermal deformation and surface defects, and the photochromic properties will be essentially uniform throughout the area of the sheet, which comprises the steps of:
   (a) placing a sheet of potentially photochromic glass having a thickness of about 0.5–3 mm atop a carrier sheet of silica-based refractory glass having a thickness of about 1–5 mm and exhibiting a softening point at least 50° C. higher than the temperature at which said potentially photochromic glass is to be heat treated to effect in situ growth of silver halide crystals;
   (b) exposing the stacked glass sheets to a temperature and for a period of time sufficient to effect adequate in situ growth of silver halide crystals in said potentially photochromic glass sheet to impart photochromic properties to the glass; and then
   (c) removing said photochromic glass sheet from atop said carrier sheet to provide said heat treated sheet of glass exhibiting photochromic properties which are uniform throught the entire sheet, with the heat treated glass being essentially free from thermal deformation and surface defects.

2. A method according to claim 1 wherein said potentially photochromic glass has a composition within the alkali metal aluminoborosilicate system.

3. A method according to claim 1 wherein said sheet has a thickness ranging about 1-2 mm.

4. A method according to claim 1 wherein said carrier sheet of glass has a composition selected from the group consisting of borosilicate glasses and aluminosilicate glasses.

5. A method according to claim 1 wherein said carrier sheet of glass exhibits a softening point of at least 800° C.

6. A method according to claim 1 wherein said carrier sheet of glass has a thickness ranging about 1-2 mm.

7. A method according to claim 1 wherein said stacked glass sheets are exposed to a temperature between about 600°-800° C.

8. A method according to claim 7 wherein said stacked glass sheets are exposed to a temperature between about 640°-700° C.

* * * * *